United States Patent [19]
Hirao

[11] 3,906,322
[45] Sept. 16, 1975

[54] SHAFT ROTATION RESPONSIVE STOPPING MEANS FOR A MOTOR-DRIVEN CHUCK

[75] Inventor: Kenichi Hirao, Kawasaki, Japan

[73] Assignee: Fuji Electric Company Ltd., Kawasaki, Japan

[22] Filed: Mar. 14, 1974

[21] Appl. No.: 451,268

[30] Foreign Application Priority Data
Mar. 14, 1973 Japan.................................. 48-31580

[52] U.S. Cl. .................... 318/464; 318/449; 317/19
[51] Int. Cl.² .......................................... H02H 7/08
[58] Field of Search ........... 318/449, 450, 451, 464; 317/19

[56] References Cited
UNITED STATES PATENTS

| | | | |
|---|---|---|---|
| 2,713,138 | 7/1955 | Lanfers et al. | 318/464 |
| 3,165,670 | 1/1965 | Baude | 318/464 X |
| 3,436,637 | 4/1969 | Ehret | 318/449 |
| 3,462,670 | 8/1969 | Waye | 318/464 |
| 3,546,530 | 12/1970 | Simonsen | 317/19 X |
| 3,626,247 | 12/1971 | Morse | 317/19 X |
| 3,731,193 | 5/1973 | Darrow | 317/19 X |

*Primary Examiner*—T. E. Lynch
*Attorney, Agent, or Firm*—Sughrue, Rothwell, Mion, Zinn & Macpeak

[57] ABSTRACT

An electrical pulse generator responsive to chuck drive motor shaft rotation feeds pulses to a revolution indicator which also receives an alternating current input signal whose frequency corresponds to the line frequency of the electrical source which feeds the chuck drive motor. A decrease in shaft rotation speed and a variance between the frequency of the pulses from the pulse generator and the frequency of the alternating current source to the motor results in de-energization of a control coil connected across the revolution indicator to open the line which connects the source of alternating current to the induction clutch drive motor. A manually operated push button may override the output relay controlled by the revolution indicator which in turn controls the control coil.

3 Claims, 2 Drawing Figures

3,906,322

SHAFT ROTATION RESPONSIVE STOPPING MEANS FOR A MOTOR-DRIVEN CHUCK

BACKGROUND OF THE INVENTION

1. Field of the Invention

This invention relates to electric motor driven chuck and more particularly to an electrical control system for shutting down the chuck drive motor after the chuck shaft has been rotated sufficiently to clamp a machine tool or the like under sufficient clamping torque.

2. Description of the Prior Art

In automatically operated chucks for machine tools, especially those wherein the main shaft of the chuck is drivingly rotated to provide a chuck clamping force of predetermined value, generally an electrical signal is derived indicating completion of clamping and this signal is used to terminate rotation of the main shaft of the chuck. Normally, the driving system for a motor-driven chuck device employs a corresponding relationship of one to one between the movement of the pawls of the chuck and the number of revolutions of the chuck driving motor. Such clamping force detection systems rely on the sensing of the overcurrent of the electrical motor driving the same by means of a current relay and the chuck pawls are moved or driven by an induction motor having a constant torque characteristic to effect the desired clamping of the articles held by the chuck, such as a machine tool. When the chuck pawls contact the articles such as the machine tool to be held by the chuck, clamping occurs under a torque related to the stop torque which the induction motor inherently possesses. In such a process, an increase in current produced within the lead wires to the induction motor is detected by a current relay by way of a current transformer, and the supply of current to the induction motor is interrupted before or after the flow of the "stop current", so as to terminate the clamping of the tool at maximum torque provided by the induction motor and at the same time provide an electrical signal responsive to such increase in current indicating the completion of the clamping process by the chuck.

The clamping force at this moment is a constant value determined by the energy of inertia of the rotating drive system in the motor driven chuck, and the torque characteristic of the induction motor. However, such a system has the following drawbacks:

1. The operation set points of the current relay and the adjustable register must be adjusted to correspond to the current drawing variation of the motor employed. The adjustment is difficult because it is confined within a very small range.

2. Deviation of the clamping force is large because the current variation within the motor is quite large under working conditions due to voltage fluctuation, and the environmental use condition of the motor, that is, whether it is hot or cold, etc.

3. Such systems are necessarily designed for a given alternating current frequency of the source and a motor driven chuck designed for 50 cycle use cannot be employed with a 60 cycle current source, and vice versa.

The object of the present invention is to provide a motor driven chuck with a detector which detects cessation of chuck shaft rotation, which detector is relatively low in price, which is free of the above mentioned drawbacks, which during clamping of the tool or other work assures the provision of a constant clamping force and which is satisfactory in practice under all working environmental conditions, which at the same time provides an electrical output signal indicative of the completion of clamping and which permits the control to cooperate with other automatically operated machinery.

SUMMARY OF THE INVENTION

In accordance with the present invention, a motor driven chuck is provided with a shaft rotation detector consisting of a toothed disc operatively coupled to the chuck driving motor and rotating in response thereto, and operates in conjunction with a magnetic circuit to generate electrical pulses at a frequency proportional to rotational speed of the shaft supporting the rotating disc. A revolution indicator provides a "coincidence" circuit, in that when there is a sufficient variance between the frequency of the pulses from the pulse generator and the frequency of the line current fed to the motor, this indicates cessation of rotation of the motor shaft and is indicative of a predetermined clamping force being exerted by the chuck on the work piece being clamped thereby. An output relay responsive to the coincidence circuit of the revolution indicator controls in turn energization of a control coil for an electro-magnetic line switch or relay disconnecting the chuck driving motor from the alternating current electrical source. By this arrangement, no inconvenience is experienced such as the need for the adjustment of an electrical resistor within the detection network as in the previous system, and no adjustment is required when shifting the chuck from a 50 cycle to 60 cycle alternating current and vice versa, since the motor speed will vary with the frequency of the line current which in turn varies the frequency of pulses generated by generator 6 which is driven thereby.

DESCRIPTION OF THE PREFERRED EMBODIMENT

Figure 1:
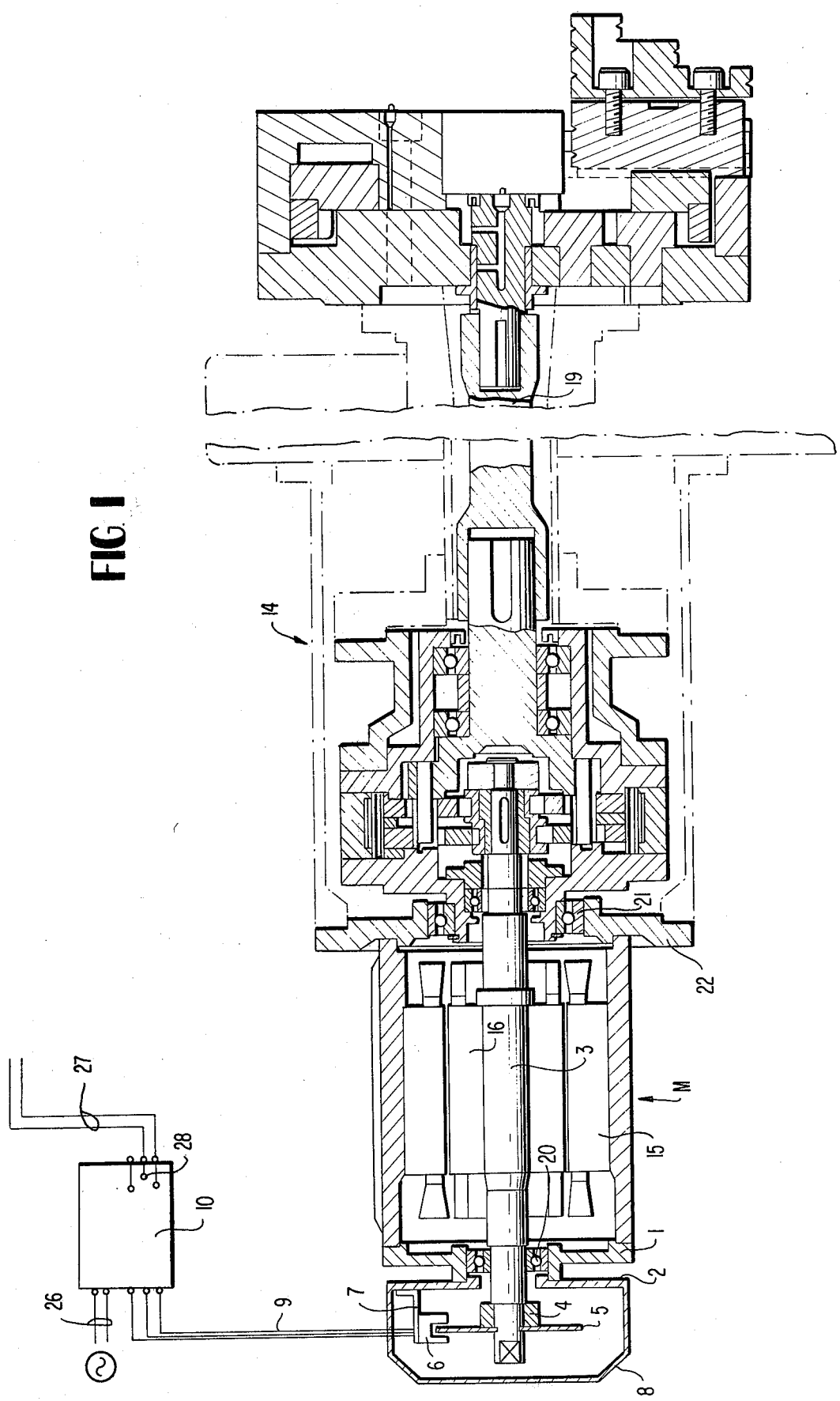
FIG. 1 is a partial schematic, sectional view of an electrical motor driven chuck in accordance with the present invention.

Referring to the drawings, the motor driven chuck of the present invention is indicated generally at 14, and with the exception of the motor M no reference will be made to the chuck. The invention does not pertain to the make-up of the chuck itself with the exception that the pawls of the chuck are operated to effect the clamping force on the tool (not shown) by rotation of chuck main shaft 19 which is achieved in a mechanically coupled manner by rotation of motor shaft 3 which is mounted for rotation about its axis by bearings 20 and 21 within bearing shield 1 and the chuck end plate 22, respectively. The motor shaft 3 carries rotor 16 which rotates internally and spaced slightly from the fixed stator 15. In the drawings, a mounting plate 2 is fixed to the bearing shield 1 to the side opposite stator 15 with the end of motor shaft 3 protruding to the left of bearing shield 1, FIG. 1. On that exposed portion of shaft 3, there is fixedly mounted a thin disc 5 whose periphery is slit to provide a series of teeth 23 which are circumferentially spaced by gaps 24, the disc 5 being supported on the end of a shaft by a fixed cylinder 4. The disc 5 acts as the rotary member of a pulse generator 6, with a fixed magnetic stator 25 further provided and a pickup coil (not shown) and operating conventionally to effect the production of electrical pulses whose frequency and amplitude correspond to the rotary speed of the disc 5 and the number of teeth 23 thereon. The electrical output of the pulse generator is delivered through lead wires 9 to a revolution indicator 10, indicated schematically in block form, and comprising a "coincidence" circuit in which the frequency of the electrical pulses from generator 6 is compared to the frequency of the alternating current of source 29 feeding the motor M. This input to the revolution indicator 10 is indicated at 26. The pulse generator 6 has its stator 25 fixedly mounted by means of a supporting plate 7 which, in turn, is fixed to mounting plate 2 such that disc 5 rotates between the two legs of stator 25. The parts making up the pulse generator 6 are protected by means of a cover 8 which is fixed at its periphery to the mounting plate 2 so as to overly support plate 7 and the other element of the pulse generator 6 leads 26 supply alternating current to the counter and output relay 10. Further, the revolution indicator 10 includes an output relay incorporating normally closed switch contacts 28 which by way of leads 27 control in response to predetermined pulse comparison of frequency and line frequency, the energization of a control coil 11R which in turn operates a relay or circuit breaker 11 controlling the application of alternating electrical current to the induction motor M.

Figure 2:
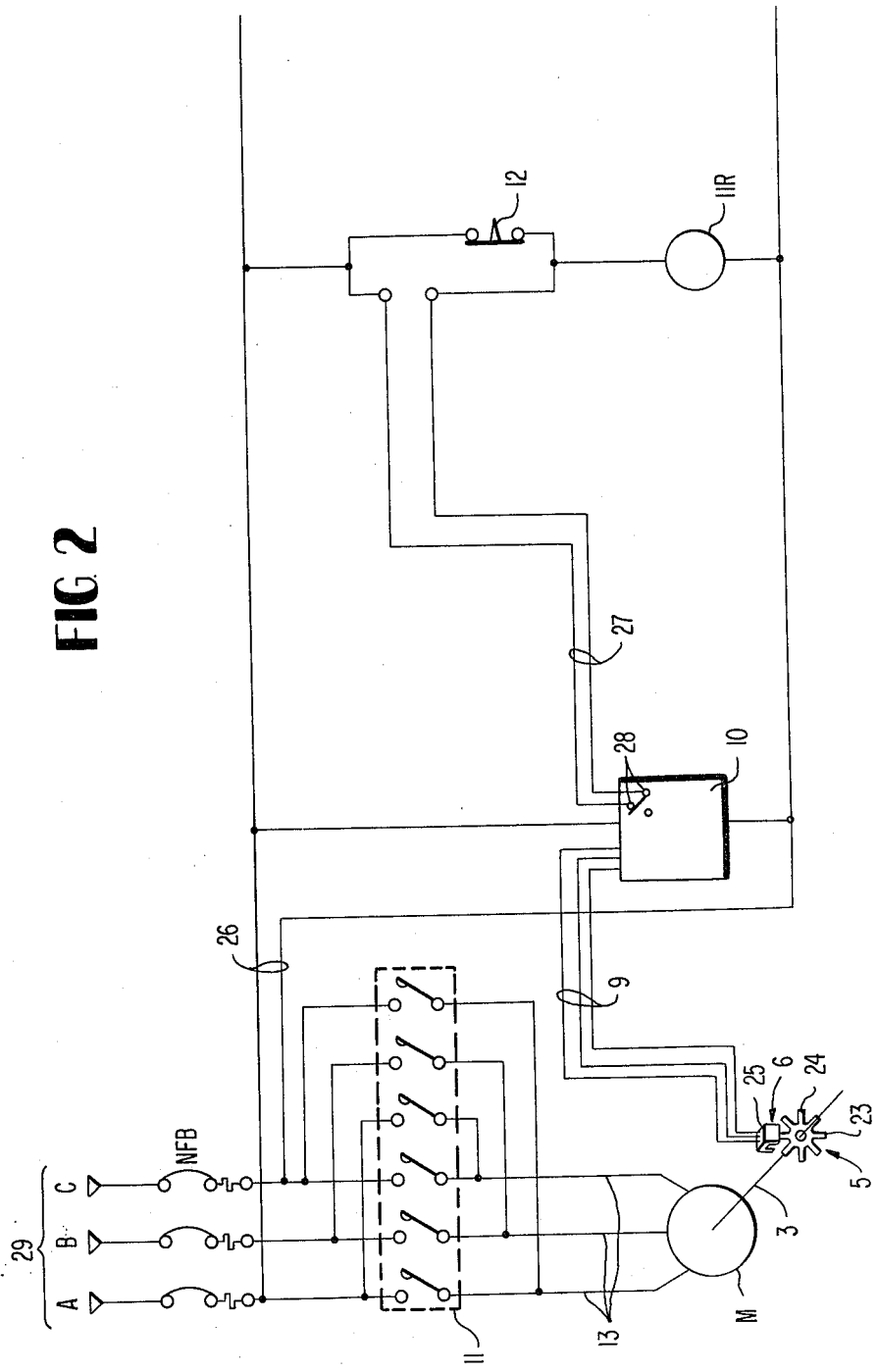
FIG. 2 is an electrical circuit diagram of the pulse control motor driven chuck of FIG. 1.

In this respect, reference to FIG. 2, electrical leads 27 place the control coil 11R across the contacts 28 of the output relay, energized by two phases such as phase A and phase C of the three phase electrical alternating current electrical source 29. The switch contacts 28 of the revolution indicator 10 and output relay are connected to the electrical source 29 in parallel with a normally closed push button switch 12. The push button switch 12 is so adapted that it can interrupt the excitation of the control coil 11R manually, so as to stop the chuck driving motor M regardless of the condition of the switch contacts 28 of the revolution indicator 10 and output relay.

In operation, during the initial energization of the motor M by applying electrical source 29 consisting of alternating current phases A, B, C through motor feeders 13 to motor M, rotation of motor shaft 3 causes the generator 6, in the absence of the load exerted by the tool on the chuck pawls, to produce electrical pulses whose frequency, coincides with the frequency of the alternating current source by normal operation of the coincidence circuit of the revolution indicator 10. During coincidence, switch contacts 28 are closed and the control coil 11R is energized to maintain the switch contacts of relay 11 closed. However, when rotation of shaft decreases in speed or in fact stops, to such an extent that coincidence ceases between the inputs through lead wires 9 and wires 26 to the revolution indicator 10, the output relay switch contacts 28 open. The control coil 11R is de-energized and the contacts of relay 11 open to disconnect the motor feeders 13 from the alternating current source 29. Accordingly, with the supply of electrical power to the chuck driving motor M being interrupted, preferably prior to full stopping as the tool is clamped within the chuck, further shaft rotation ceases and in this way burn out of the chuck driving motor M is avoided. Other controls (not shown) may place the chuck and its drive motor M in a condition where the current to the motor is reversed, opening of the chuck jaws, and permitting removal of the tool, and this arrangement which may also be automatically controlled is not a part of the present invention.

What is claimed is:

1. In an alternating current motor driven chuck including a chuck for mechanically clamping a machine tool to a main shaft, and electric motor with a rotatable shaft coupled to said chuck for driving said chuck, a source of alternating electrical current, the improvement comprising:

an electrical pulse generator operatively arranged relative to said motor shaft and responsive to shaft rotation for providing electrical pulses having a frequency proportional to shaft rotation speed, and relay means responsive to coincidence between the frequencies of said source and the output of said generator for controlling energization of said motor by said source;

whereby, reduction in the speed of rotation of said motor shaft as said chuck clamps said tool, and reduction of pulse generator frequency below a preset value causes said relay means to instantaneously disconnect said motor from said electrical source.

2. The motor driven chuck as claimed in claim 1, wherein said relay means comprises; normally open line switch contacts in the line leading from said electrical source to said motor, a control coil operatively associated with said normally open switch contacts and an output relay having switch contacts in series with said control coil and said electrical source and in parallel with said motor; whereby, rotation of said motor at a predetermined speed causes said generator to maintain said output relay contacts closed and said control coil energized to maintain said motor connected to said source through said normally open line switch contacts.

3. The motor driven chuck as claimed in claim 2, further comprises a normally closed push button switch in parallel with said output relay contacts and in series with said source and said control coil; whereby, regardless of the condition of said output relay contacts, said control coil may be de-energized by operation of said push button switch.

* * * * *